(No Model.)

F. P. THOMPSON.
WRENCH.

No. 552,795.  Patented Jan. 7, 1896.

Witnesses:
F. L. Durand
W. L. Coombs

Inventor:
Frederic P. Thompson,
by Louis Bagger & Co.
Attorneys.

UNITED STATES PATENT OFFICE.

FREDERIC PEMBERTON THOMPSON, OF FREDERICTON, CANADA.

WRENCH.

SPECIFICATION forming part of Letters Patent No. 552,795, dated January 7, 1896.

Application filed April 22, 1895. Serial No. 546,731. (No model.)

*To all whom it may concern:*

Be it known that I, FREDERIC PEMBERTON THOMPSON, a subject of the Queen of Great Britain, and a resident of Fredericton, Province of New Brunswick, and Dominion of Canada, have invented certain new and useful Improvements in Monkey-Wrenches; and I do hereby declare that the following is a full, clear, and exact description of the invention, which will enable others skilled in the art to which it appertains to make and use the same, reference being had to the accompanying drawings, which form a part of this specification.

My invention relates to improvements in monkey-wrenches, and its object is to provide a tool or implement of this description which shall possess superior advantages with respect to efficiency in use.

The invention consists in the novel construction and combination of parts hereinafter fully described and claimed.

Figure 1:
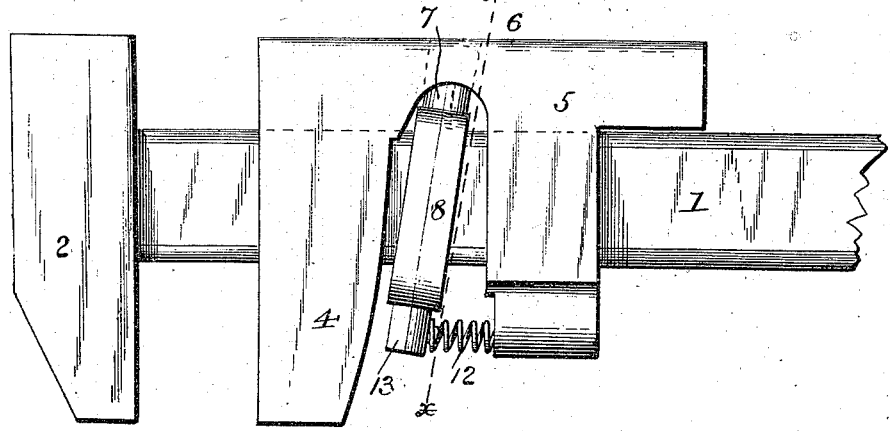
Figure 2:
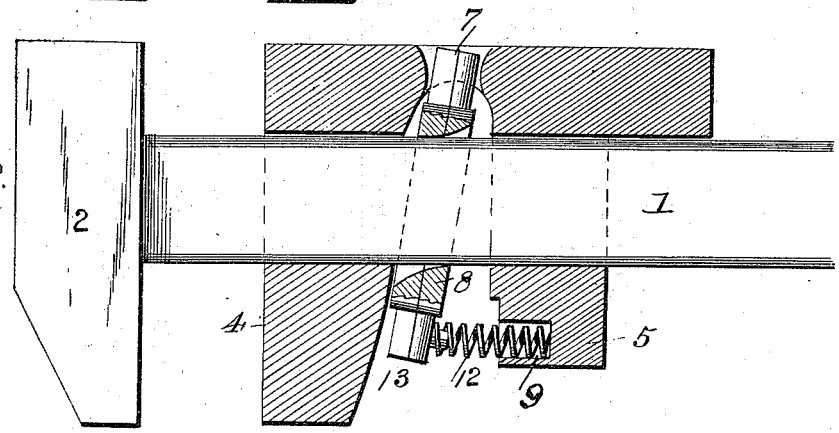
Figure 3:
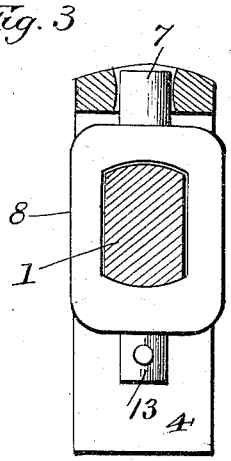
Figure 4:
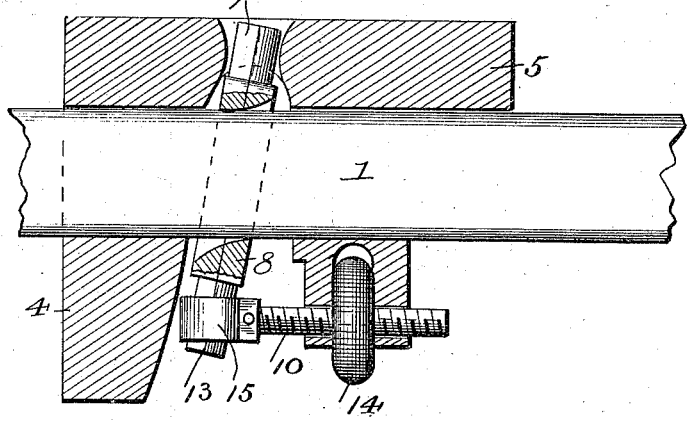

In the accompanying drawings, Figure 1 is a side elevation of a monkey-wrench constructed in accordance with my invention. Fig. 2 is a central longitudinal section of the same, the fixed jaw and shank being shown in full. Fig. 3 is a cross-section on the line *x x*, Fig. 1. Fig. 4 is a longitudinal section showing a modified construction.

In the said drawings, the reference-numeral 1 designates the shank of the wrench, preferably oval-shaped in cross-section, as shown in Fig. 3, and provided with the usual stationary jaw 2.

The numeral 4 designates the movable jaw provided with an extension 5, connected therewith by a web 6. This jaw and extension are provided with openings corresponding with the shape of the shank which passes therethrough. Passing loosely through an aperture in the web is the cylindrical end 7 of a link 8 provided with an aperture, corresponding in shape but somewhat larger than the shank, so that the latter passes loosely therethrough. Seated in a recess 9 in the extension 5 is a coiled spring 12, which bears against the lower end of the link.

In the modification shown in Fig. 4 the extension is provided with a screw-threaded aperture in which works a screw-rod 10, provided with a wheel 14 by which it may be rotated. The inner end of this rod is pivoted to a collar 15, secured to the lower end of the link.

The operation is as follows: As shown in Figs. 1 and 2, the spring 12 forces one end of the link away from the extension, causing the diagonal edges of the link to press against or bite upon opposite sides of the shank, thus securely holding the movable jaw to any position to which it may be adjusted, and in use the greater the pressure upon the movable jaw the greater the bite of the levers upon the jaw. To release the link in order to adjust the jaw on the shank, it is only necessary to press the lower end of the link toward the extension, when the biting-edges will be disengaged, so that the jaw may be moved along the shank to attain the proper adjustment. The link is then released, when the spring will again actuate the link and cause it to be automatically engaged with the shank to hold the jaw in position.

In order to shift the movable jaw on the shank of the wrench the lower end 13 of the link 8 is drawn back to compress the spring and release the bite of the link on the shank 1, at which time the movable jaw, its extension and the link may be shifted in either direction longitudinally on the shank of the wrench; but as soon as the hold on the link is withdrawn the spring 12 will expand and cause the link to be engaged with the shank. As illustrated in the modification, Fig. 4, the link is operated in both directions by the collar 15, screw 10 and hand-wheel 14, so that in this instance the spring is dispensed with.

Having thus fully described my invention, what I claim is—

The combination with the shank and the stationary jaw at one end thereof, of the movable jaw provided with an extension connected therewith by an integral web having an aperture between the movable jaw and its extension, the link having cylindrical end-projections and an aperture corresponding in shape to but larger than the shank in cross-section, and having biting-edges on the inner opposite faces of its end-portions, the recess in the lower portion of the extension, and the coiled spring seated in the recess in said lower portion of the extension and engaging the lower end-projection of the link, substantially as specified.

In testimony that I claim the foregoing as my own I have hereunto affixed my signature in presence of two witnesses.

FREDERIC PEMBERTON THOMPSON.

Witnesses:
W. M. KARE,
R. W. McLELLAN.